US012742060B2

(12) United States Patent
Schüle et al.

(10) Patent No.: US 12,742,060 B2
(45) Date of Patent: Sep. 22, 2026

(54) FLOOR COVERING AND METHOD FOR THE PRODUCTION THEREOF

(71) Applicant: NORA SYSTEMS GMBH, Weinheim (DE)

(72) Inventors: Hanna Schüle, Heppenheim (DE); Mario Kröger, Bruchsal (DE)

(73) Assignee: NORA SYSTEMS GMBH, Weinheim (DE)

( * ) Notice: Subject to any disclaimer, the term of this patent is extended or adjusted under 35 U.S.C. 154(b) by 80 days.

(21) Appl. No.: 16/469,767

(22) PCT Filed: Dec. 14, 2017

(86) PCT No.: PCT/EP2017/082913

§ 371 (c)(1),
(2) Date: Jun. 14, 2019

(87) PCT Pub. No.: WO2018/109116

PCT Pub. Date: Jun. 21, 2018

(65) Prior Publication Data

US 2020/0095402 A1 Mar. 26, 2020

(30) Foreign Application Priority Data

Dec. 15, 2016 (DE) ........................ 102016124555.0

(51) Int. Cl.

| | |
|---|---|
| ***C08L 9/06*** | (2006.01) |
| ***C08J 3/00*** | (2006.01) |
| ***C08L 7/00*** | (2006.01) |
| ***C08L 9/02*** | (2006.01) |
| ***C08L 23/0853*** | (2025.01) |
| ***C08L 23/16*** | (2006.01) |
| ***C08L 33/06*** | (2006.01) |
| ***C08L 33/10*** | (2006.01) |
| ***C08L 51/04*** | (2006.01) |
| ***C08L 53/02*** | (2006.01) |
| ***E04F 15/10*** | (2006.01) |

(52) U.S. Cl.

CPC ................ *C08L 9/06* (2013.01); *C08J 3/005* (2013.01); *C08L 7/00* (2013.01); *C08L 9/02* (2013.01); *C08L 23/0853* (2013.01); *C08L 23/16* (2013.01); *C08L 33/064* (2013.01); *C08L 33/10* (2013.01); *C08L 51/04* (2013.01); *C08L 53/02* (2013.01); *E04F 15/105* (2013.01); *C08L 2205/02* (2013.01); *C08L 2205/035* (2013.01); *C08L 2207/04* (2013.01)

(58) Field of Classification Search

CPC .................................................... E04F 15/105

See application file for complete search history.

(56) References Cited

U.S. PATENT DOCUMENTS

| | | | |
|---|---|---|---|
| 3,770,536 | A | 11/1973 | Haigh |
| 4,694,627 | A | 9/1987 | Omholt |
| 4,755,545 | A | 7/1988 | Lalwani |
| 5,271,999 | A | 12/1993 | Short |
| 5,561,185 | A | 10/1996 | Hashimoto et al. |
| 5,650,215 | A | 7/1997 | Mazurek et al. |
| 5,824,735 | A | 10/1998 | Graab et al. |
| 6,123,890 | A | 9/2000 | Mazurek et al. |
| 6,428,873 | B1 | 8/2002 | Kerr |
| 6,630,042 | B2 | 10/2003 | Smith et al. |
| 6,861,476 | B2 | 3/2005 | Braga et al. |
| 7,494,713 | B2 | 2/2009 | Song et al. |
| 7,833,611 | B2 | 11/2010 | Phan et al. |
| 9,163,356 | B2 | 10/2015 | Kuik et al. |
| 9,598,871 | B2 | 3/2017 | Qiong |
| 9,650,545 | B2 | 5/2017 | Liu et al. |
| 9,884,980 | B2 | 2/2018 | Zhang et al. |
| 10,794,066 | B2 | 10/2020 | Kroeger et al. |
| 2002/0129895 | A1 | 9/2002 | Smith et al. |
| 2003/0040582 | A1 | 2/2003 | Braga et al. |
| 2005/0081330 | A1 * | 4/2005 | Edwards ................ A47B 91/06 16/42 R |
| 2005/0112320 | A1 | 5/2005 | Wright |

(Continued)

FOREIGN PATENT DOCUMENTS

| | | |
|---|---|---|
| CN | 1365376 | 8/2002 |
| CN | 1378579 | 11/2002 |

(Continued)

OTHER PUBLICATIONS

An Introduction to Rubber Technology, Andrew Ciesielski, ISBN: 1-85957-150-6 (Year: 1999).*

Natta et al (Polyolefin Elastomers, Rubber Chemistry and Technology, vol. 36, Issue 5, 1963) (Year: 1963).*

Baldwin et al (Polyolefin Elastomers Based on Ethylene and Propylene, Rubber Chemistry and Technology, (1972) 45 (3), 709-881) (Year: 1972).*

Zanchin et al (Polyolefin thermoplastic elastomers from polymerization catalysis: Advantages, pitfalls and future challenges, Progress in Polymer Science 113(2021) 101342 (Year: 2021).*

Singh et al (Photodegradation and stabilization of styrene-butadiene-styrene rubber, Journal of Applied Polymer Science, vol. 75, Issue 9, 2000, p. 1103-1114) (Year: 2000).*

(Continued)

*Primary Examiner* — Wenwen Cai

(74) *Attorney, Agent, or Firm* — Kilpatrick Townsend & Stockton LLP

(57) ABSTRACT

The invention relates to a floor covering comprising a sheet material (11) having a polymer composition comprising a first polymeric component (K1) and a second polymeric component (K2), wherein the first polymeric component (K1) comprises at least one substance selected from a group consisting of a thermoplastic and a thermoplastic elastomer. The invention is characterized in that the second polymeric component (K2) comprises a rubber and in that the polymer composition is produced by mixing the first polymeric component (K1) and the second polymeric component (K2) after the first and second polymeric components (K1, K2) have been softened by supplying energy. The invention also relates to a method for producing the floor covering.

12 Claims, 3 Drawing Sheets

(56) References Cited

U.S. PATENT DOCUMENTS

Figure 1:
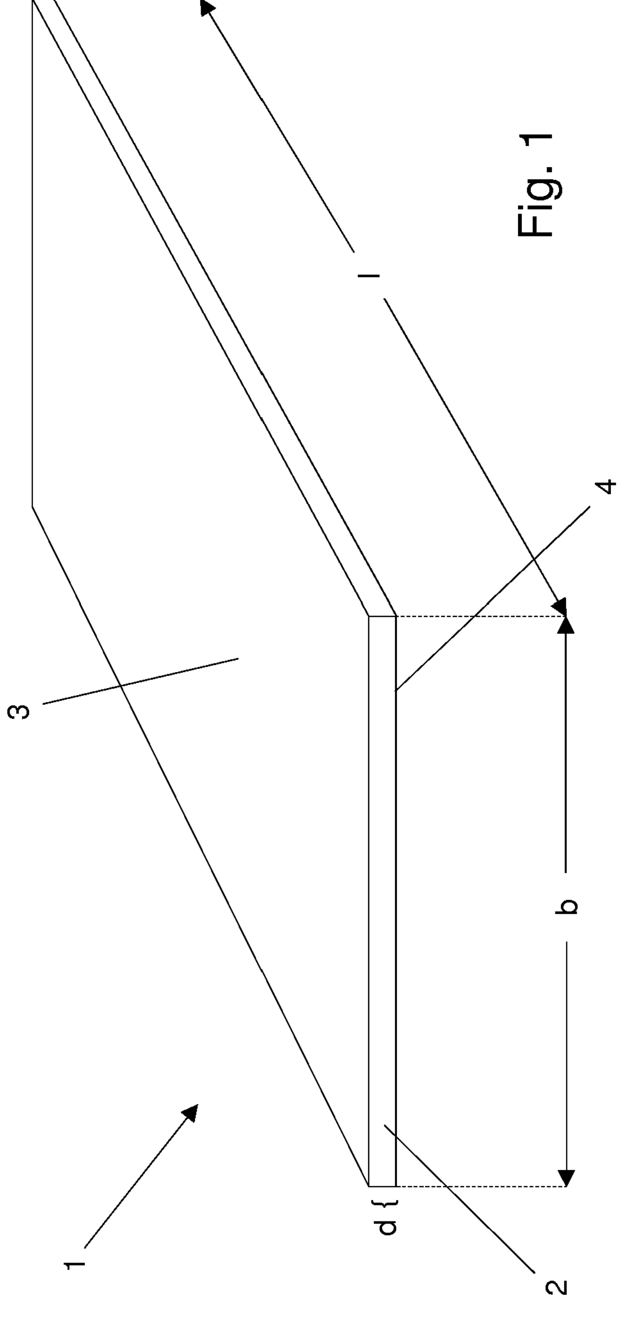

| | | | | |
|---|---|---|---|---|
| 2005/0142356 | A1 | 6/2005 | Zhou | |
| 2006/0059825 | A1 | 3/2006 | Wiercinski et al. | |
| 2006/0062955 | A1 | 3/2006 | Liu et al. | |
| 2006/0189759 | A1* | 8/2006 | Walther | C08L 23/0815 525/192 |
| 2006/0281852 | A1 | 12/2006 | Inada | |
| 2007/0087159 | A1 | 4/2007 | Wright | |
| 2007/0087160 | A1 | 4/2007 | Wright | |
| 2007/0116959 | A1 | 5/2007 | Wang | |
| 2007/0254175 | A1* | 11/2007 | Song | D06N 3/183 428/500 |
| 2008/0053335 | A1* | 3/2008 | Gustafsson | C09D 121/00 106/241 |
| 2008/0081186 | A1 | 4/2008 | Ellringmann et al. | |
| 2009/0226661 | A1 | 9/2009 | Laurent | |
| 2011/0039051 | A1 | 2/2011 | Flowers, Jr. et al. | |
| 2011/0281094 | A1 | 11/2011 | Zanchetta et al. | |
| 2011/0305886 | A1 | 12/2011 | Phan et al. | |
| 2012/0277365 | A1 | 11/2012 | Mercier et al. | |
| 2012/0309876 | A1* | 12/2012 | Bastin | C08L 23/0815 524/275 |
| 2013/0055665 | A1 | 3/2013 | Qiong | |
| 2013/0089689 | A1 | 4/2013 | Liu et al. | |
| 2013/0284364 | A1 | 10/2013 | Couturier et al. | |
| 2013/0296504 | A1 | 11/2013 | Sugi et al. | |
| 2013/0330528 | A1 | 12/2013 | Keller et al. | |
| 2014/0011929 | A1 | 1/2014 | Knoll et al. | |
| 2014/0030503 | A1 | 1/2014 | Wright | |
| 2015/0121793 | A1 | 5/2015 | Segaert et al. | |
| 2015/0284903 | A1 | 10/2015 | O'Conner et al. | |
| 2015/0376368 | A1 | 12/2015 | Zucchelli | |
| 2016/0319170 | A1 | 11/2016 | Zhang et al. | |
| 2017/0298255 | A1 | 10/2017 | Liu et al. | |
| 2018/0127987 | A1 | 5/2018 | Bradway et al. | |
| 2018/0371765 | A1 | 12/2018 | Adametz et al. | |

FOREIGN PATENT DOCUMENTS

| | | |
|---|---|---|
| CN | 101018905 | 8/2007 |
| CN | 201746764 | 2/2011 |
| CN | 202000620 | 10/2011 |
| CN | 102712791 | 10/2012 |
| CN | 102747613 | 10/2012 |
| CN | 103194950 | 7/2013 |
| DE | 1479605 | 5/1969 |
| DE | 3743297 | 6/1989 |
| DE | 3843482 | 6/1990 |
| DE | 4440394 | 5/1995 |
| DE | 19507113 | 2/1996 |
| DE | 19934743 | 2/2000 |
| DE | 69327611 | 7/2000 |
| DE | 602004008245 | 5/2008 |
| DE | 102009059172 | 6/2011 |
| DE | 102009060440 | 6/2011 |
| DE | 102010036121 | 3/2012 |
| DE | 102012003613 | 8/2013 |
| DE | 102012005312 | 9/2013 |
| DE | 102015118618 | 5/2017 |
| EP | 0270888 | 6/1988 |
| EP | 0839948 | 5/1998 |
| EP | 1176246 | 1/2002 |
| EP | 1616923 | 1/2006 |
| EP | 1793032 | 6/2007 |
| EP | 2107081 | 10/2009 |
| EP | 2452815 | 5/2012 |
| EP | 2504389 | 10/2012 |
| EP | 2513208 | 10/2012 |
| EP | 2759636 | 7/2014 |
| JP | 5460049 | 5/1979 |
| JP | 08244057 | 9/1996 |
| JP | 09302903 | 11/1997 |
| JP | 2002276141 | 9/2002 |
| JP | 2005054001 | 3/2005 |
| JP | 2005120559 | 5/2005 |
| JP | 2005163534 | 6/2005 |
| KR | 960705891 | 11/1996 |
| KR | 20070097743 | 10/2007 |
| RU | 2129133 | 4/1999 |
| RU | 2373311 | 11/2009 |
| RU | 2524310 | 7/2014 |
| RU | 2567298 | 11/2015 |
| SU | 642202 | 1/1979 |
| WO | 9320146 | 10/1993 |
| WO | 0027892 | 5/2000 |
| WO | WO 2011/063849 | 6/2011 |
| WO | 2012017235 | 2/2012 |
| WO | WO 2014/005631 | 1/2014 |
| WO | 2014096336 | 6/2014 |
| WO | 2015089957 | 6/2015 |

OTHER PUBLICATIONS

Kraton Polymers (Kraton Polymers for Modification of Thermoplastics). (Year: 2025).*

"How to Replace EVA with EXACT", TER Group, Accessed from Internet on: Jan. 18, 2021, 3 pages.

"Infuse™ Olefin Block Copolymer Introduction", Accessed from Internet on: Jan. 18, 2021, pp. 1-19.

"Nora Newsletter", Nora Systems GmbH, Apr. 2015, 16 pages.

U.S. Appl. No. 16/064,739, Final Office Action mailed on Oct. 28, 2019, 14 pages.

U.S. Appl. No. 16/064,739, Non-Final Office Action mailed on Feb. 26, 2020, 16 pages.

U.S. Appl. No. 16/064,739, Non-Final Office Action mailed on May 17, 2019, 8 pages.

U.S. Appl. No. 16/064,739, Notice of Allowance mailed on Jun. 17, 2020, 8 pages.

U.S. Appl. No. 16/065,219, Advisory Action mailed on Oct. 23, 2020, 8 pages.

U.S. Appl. No. 16/065,219, Final Office Action mailed on Jul. 23, 2020, 17 pages.

U.S. Appl. No. 16/065,219, Non-Final Office Action mailed on Jan. 21, 2020, 15 pages.

Russian Application No. 2018124505/04, Office Action mailed on Aug. 6, 2019, 2 pages.

Baur et al., "Saechtling Kunststoff Taschenbuch", vol. 29, Accessed from Internet on: Jan. 18, 2021, pp. 400-401.

Chinese Application No. 201680074887.6, Office Action mailed on Apr. 7, 2020, 8 pages.

Chinese Application No. 201680081526.4, Office Action mailed on Sep. 18, 2019, 10 pages.

Chinese Application No. 201680081526.4, Office Action mailed on Aug. 31, 2020, 15 pages.

Germany Application No. 102015122532.8, "Search Report" mailed on Aug. 23, 2016, 9 pages.

Germany Application No. 102016110589.9, "Search Report" mailed on Apr. 21, 2017, 9 pages.

Habenicht et al., "Kleben, Grundlagen, Technologien, Anwendung", Springer, 4th Edition, 2002, pp. 61-64.

PCT Application No. PCT/EP2016/081429, International Preliminary Report on Patentability mailed on Jul. 5, 2018, 9 pages.

PCT Application No. PCT/EP2016/081429, International Search Report and Written Opinion mailed on Feb. 6, 2017, 22 pages.

PCT Application No. PCT/EP2016/081492, International Preliminary Report on Patentability mailed on Jul. 5, 2018, 12 pages.

PCT Application No. PCT/EP2016/081492, International Search Report and Written Opinion mailed on Mar. 16, 2018, 26 pages.

Russian Application No. 2018124349/03, "Search Report" mailed on Aug. 19, 2019, 2 pages.

RU Application No. 2019118387/04 (035206), "Search Report", Apr. 1, 2020, 5 pages.

Official Action for German Patent Application No. 102016124555.0, dated Jul. 20, 2017, 8 pages.

International Search Report for International (PCT) Patent Application No. PCT/EP2017/082913, dated Apr. 18, 2018, 12 pages.

U.S. Appl. No. 16/065,219 , Non-Final Office Action, Mailed On Aug. 3, 2021, 18 pages.

(56) References Cited

OTHER PUBLICATIONS

"Kautschuk"—Fritz Rothemeyer, et al., Kautschuk Technologie, Werkstoff—Verarbeitung—Produkte , Hanser, p. 13 2006. A certified English translation of p. 13 is provided.
Mexpolimeros, *Difference between SBS and SBR*, available at https://www.mexpolimeros.com/eng/diferencia%20entre%20sbs%20v%20sbr.html, no publication date.
OringsUSA, SBR, available at https://www.oringsusa.com/o/sbr/, 2021.
Hanhi K., et al., Elastomeric Materials, 2007.
Drobny, J., Handbook of Thermoplastic Elastomers, second ed., 2014.
Arlanxeo Performance Elastomers Handbook of Synthetic Rubber, 2021.
U.S. Appl. No. 16/065,219 , Final Office Action, Mailed On Feb. 16, 2022, 18 pages.
U.S. Appl. No. 16/065,219 , Non-Final Office Action, Mailed On May 25, 2022, 37 pages.
U.S. Appl. No. 16/065,219 , Final Office Action, Mailed On Feb. 3, 2023, 39 pages.

* cited by examiner

1'
1''
2
3
4
5
6
7
8

FLOOR COVERING AND METHOD FOR THE PRODUCTION THEREOF

CROSS REFERENCE TO RELATED APPLICATIONS

This application is a national stage application under 35 U.S.C. 371 and claims the benefit of PCT Application No. PCT/EP2017/082913 having an international filing date of 14 Dec. 2017, which designated the United States, which PCT application claimed the benefit of German Patent Application No. 10 2016 124 555.0 filed 15 Dec. 2016, the disclosure of each of which are incorporated herein by reference.

The present invention relates to a floor covering comprising a sheet material having a polymer composition comprising a first polymeric component and a second polymeric component, wherein the first polymeric component comprises at least one substance selected from a group consisting of a thermoplastic and a thermoplastic elastomer. The present invention also relates to a method for producing a floor covering with the following step: Providing a first polymeric component comprising at least one substance selected from a group consisting of a thermoplastic and a thermoplastic elastomer.

Floor coverings made of thermoplastic materials, such as PVC, are known in the state of the art. Such a floor covering is described, for example, in DE 10 2012 003 613 A1. However, the material PVC presents serious disadvantages. For example, gaseous hydrogen chloride can be generated in the event of a fire. In addition, other health disadvantages of the material are also being discussed.

Therefore, PVC-free floor coverings have already been proposed. WO 2011/063849 A1 already describes a floor covering containing substances such as VLDPE, POE, POP. Another PVC-free floor covering containing thermoplastic elastomer is described in EP 1 793 032 A1.

A PVC-free floor covering with several layers is known from WO 2014/005631 A1. The floor covering comprises a thermoplastic blend including an olefin-based polymer, an anhydride copolymer and a filler.

Tests have shown that the known floor coverings do not have satisfactory strength values when bonded to the subfloor. In addition, the mechanical properties are not yet optimal.

In view of the above, the object of the invention is to present a floor covering that has advantageous mechanical properties and good adhesion properties, as well as a method for its production.

The object is achieved with a floor covering having the features of claim 1. Accordingly, it is provided for the floor covering mentioned above that the second polymeric component comprises a rubber and that the polymer composition is prepared by mixing the first and second polymeric components.

It has been shown that a mixture comprising a thermoplastic and/or a thermoplastic elastomer (TPE) and rubber can be used to obtain particularly advantageous floor coverings. Unvulcanized rubber comprises non-crosslinked but crosslinkable polymers that can be crosslinked to form materials with rubber-elastic properties. In the present case, rubber is used in a non-crosslinked form in the production of the polymer composition. In doing so, advantageous mechanical properties of the floor covering can be maintained. In particular, an advantageous mechanical and chemical resistance can be achieved. The floor covering is particularly resistant to wear and has good abrasion resistance. In particular, such a floor covering can also be used under increased stress, as is the case in public buildings. The floor covering is easy to lay and to clean. It is also dimensionally stable and resistant to cigarette burns. The pollution by emissions is very low. The use of conventional plasticizers in the polymer composition can be dispensed with or the quantities used can be considerably reduced. The floor covering is also colorfast. In addition, the floor covering can be adhered well. In particular, good strength values, as particularly peel strength, can be achieved during adhesion. In addition, the floor covering can be produced in good quality with a high level of process reliability. The mixture of the first and second polymeric components is particularly easy and safe to process. This contributes to favorable production costs. In particular, the first polymeric component can be different from the second polymeric component. Preferably, the first polymeric component does not contain any rubber.

The object is achieved with a method having the features of claim 5. Accordingly, it is provided that the method mentioned above includes the following further steps:

- providing a second polymeric component comprising a rubber;
- softening of the first polymeric component and the second polymeric component by supplying energy;
- producing a polymer composition by mixing the first polymeric component and the second polymeric component in the softened state in a mixer, and
- forming the polymer composition into a sheet material.

The supply of energy during softening can take place e.g. through the supply of heat or of energy in another way, e.g. through shear forces during mixing. The first and second polymeric components can be softened separately or together.

Further features of the invention are described below. The features relate to both the floor covering and the production method.

Advantageously, it is provided that the rubber is not crosslinked during the production of the floor covering. Therefore, the rubber is present in the finished floor covering as non-crosslinked rubber. For this purpose, it may be provided that the polymer composition does not contain a crosslinking system for the rubber. Furthermore, no vulcanization step is carried out during production. This contributes to advantageous mechanical properties and good adhesion properties.

A preferred embodiment of the invention provides that the rubber of the second polymeric component contains at least one substance selected from the group consisting of styrene-butadiene rubber (SBR), natural rubber (NR), isoprene rubber (IR), butadiene rubber (BR), ethylene propylene rubber (EPM), ethylene propylene diene rubber (EPDM), acrylate rubber (ACM), ethylene acrylate rubber (AEM), acrylonitrile butadiene rubber (NBR), hydrogenated acrylonitrile butadiene rubber (HNBR), chloroprene rubber (CR), chlorosulfonated polyethylene (CSM), ethylene vinyl acetate rubber (EVM), and silicone rubber (VSI). In this way, particularly advantageous physical properties of the floor covering can be achieved. The second polymeric component is particularly preferred to include NR, NBR or EVM and mixtures thereof.

It is advantageously provided that the second polymeric component comprises at least one polar rubber. The second polymeric component preferably comprises more than 10 wt % of a polar monomer. Use of a polar rubber can achieve particularly good properties of the floor covering. In addition to the mechanical properties, this also applies in particular to the laying properties and the adhesion properties.

An advantageous further development of this inventive idea provides that the polar rubber comprises at least one monomer selected from the group consisting of acrylonitrile, vinyl acetate and methacrylate. Particularly preferred are NBR, which contains acrylonitrile, and EVM, which contains vinyl acetate.

In a preferred embodiment of the invention, it is provided that the first polymeric component constitutes between 30 and 98 parts by weight relative to the total of the polymers in the polymer composition.

In another preferred embodiment of the invention, it is provided that the second polymeric component constitutes between 2 and 70 parts by weight relative to the total of the polymers in the polymer composition.

An advantageous embodiment of the invention provides that in the polymer composition the first polymeric component and the second polymeric component are completely mixed with each other. In particular, the polymer composition has no visible particles of the first or second polymeric component. "Visible" refers to the normal vision of the human eye without aids. Irrespective of this, the polymer composition may also contain other substances that are not completely mixed, but are embedded e.g. as particles therein. Examples include fillers or decorative particles.

Another advantageous embodiment provides that the first component comprises at least one component A comprising an olefin-based polymer.

An advantageous embodiment of this inventive idea provides that component A comprises at least one olefin-based polymer selected from the group consisting of ethylene vinyl acetate (EVA), ethylene methacrylic acid (EMA), ethylene butyl acrylate (EBA), ethylene ethyl acrylate (EEA), very low density polyethylene (VLDPE), linear low density polyethylene (LLDPE), polyolefin elastomer (POE), polyethylene (PE), polypropylene (PP), low density polyethylene (LDPE) and polyolefin plastomer (POP). The aforementioned substances each are thermoplastics. VLDPE has a density between 0.880 g/cm$^3$ and 0.915 g/cm$^3$. LLDPE has a density between 0.915 g/cm$^3$ and 0.925 g/cm$^3$. LDPE has a density between 0.915 g/cm$^3$ and 0.935 g/cm$^3$. VLDPE, EVA or POE as well as mixtures thereof are particularly preferred according to the invention. With these measures, particularly good adhesion properties of the floor covering and good mechanical stability can be achieved.

According to the invention, it is preferred that component A represents between 10 and 85 parts by weight relative to the total of the polymers in the polymer composition. Component A preferably accounts for between 20 and 70 parts by weight. This contributes to good adhesion properties of the floor covering and high stability.

A preferred embodiment of the invention provides that the first polymeric component comprises at least one component B comprising a polymer having acid groups and/or anhydride groups. This also contributes to advantageous mechanical properties as well as good adhesion properties. The acid groups and/or anhydride groups are preferably grafted onto the polymer.

An advantageous embodiment of the invention provides that the polymer contained in component B is an ethylene-based polymer. Component B preferably comprises polyethylene (PE), low-density polyethylene (LDPE) or ethylene vinyl acetate (EVA) or mixtures thereof. This contributes in particular to good mechanical stability along with good adhesion properties of the floor covering. LDPE and EVA are particularly preferred.

Particularly good adhesion properties of the floor covering can be obtained if the polymer comprised by component B includes maleic acid anhydride groups and/or acrylic acid groups. The maleic acid anhydride groups and/or the acrylic acid groups are preferably grafted onto the polymer. This results in particularly good adhesion properties and high mechanical stability of the floor covering. In addition, production is simple and process reliability is high. Particularly preferred are LDPE grafted with maleic acid anhydride groups (MAH-LDPE) and EVA grafted with maleic acid anhydride groups (MAH-EVA).

Another advantageous embodiment provides that for component B, the acid groups and/or anhydride groups grafted onto the polymer account for more than 1 wt % of component B. It is particularly preferred for the acid groups and/or anhydride groups to account for more than 1.5 wt % and in particular more than 2 wt %. It is preferred if the acid groups and/or anhydride groups account for less than 8 wt %. Particularly good properties can be achieved if the acid groups and/or anhydride groups make up more than 5 wt %. This applies in particular if the acid groups include acrylic acid groups. The mentioned grafting degrees contribute to good adhesion properties of the floor covering and high stability.

Preferably, component B accounts for between 1 and 40 parts by weight relative to the total of the polymers in the polymer matrix. Particularly preferably, component B accounts for between 5 and 35 parts by weight. This contributes to good adhesion properties of the floor covering and high stability.

A particularly preferred embodiment of the invention provides that the first component comprises at least one component C comprising a styrene-based thermoplastic elastomer. This also contributes to good mechanical properties of the floor covering and good adhesion properties.

A preferred embodiment provides that the styrene-based thermoplastic elastomer has a hard phase and a soft phase and that the soft phase has a glass transition temperature $T_G$ of minus 50° C. or higher. These measures contribute to good adhesion properties of the floor covering and high stability. The soft phase determines in particular the rubber-elastic properties of component C. The hard phase is responsible in particular for the dimensional stability and strength of the material. The hard phase is also significant for the thermoplastic properties of the thermoplastic elastomer. Preferably, the glass transition temperature $T_G$ of the soft phase is higher than minus 40° C. Furthermore, it is preferred that the glass transition temperature $T_G$ of the soft phase is below plus 10° C. Particularly preferably, the glass transition temperature $T_G$ of the soft phase is between minus 15° C. and plus 10° C. The hard phase preferentially has a glass transition temperature TGH above plus 90° C. Component C may in particular comprise a block copolymer, wherein at least one block forms the soft phase and at least one other block forms the hard phase. For example, in SBS, the styrene forms the hard phase, whereas the butadiene forms the soft phase. In SEBS, styrene forms the hard phase, whereas ethylene butylene forms the soft phase. In SIS, styrene forms the hard phase and isoprene the soft phase. The glass transition temperatures $T_G$ are determined by differential scanning calorimetry according to DIN EN ISO 11357-2 in the version valid on 1 Jul. 2016. The values stated in the present application are determined according to the half-step height method.

A preferred embodiment provides that component C comprises an isoprene monomer built in the polymer chain as 1,2-vinyl isomer. In this way, particularly advantageous results can be achieved. This applies in particular if the styrene content of component C is in the range between 15 and 40 wt %. Preferably, more than 30% of the isoprene monomers are built in the polymer chain as 1,2-vinyl isomer. Particularly preferred, more than 50% of the isoprene monomers are built in the polymer chain as 1,2-vinyl isomer. It has proved to be particularly advantageous in certain cases if more than 70% of the isoprene monomers are built in the polymer chain as 1,2-vinyl isomer. In particular, the 1,2-linked isoprene monomer may be part of the soft phase. These measures contribute to good adhesion properties of the floor covering and high stability. In addition, they enable a glass transition temperature $T_G$ of the soft phase to be maintained in the preferred range.

Advantageously, it can be provided that the soft phase of component C comprises styrene. Preferably, the soft phase can comprise a styrene/butadiene block. This may be the case, for example, if component C comprises an SBS with the structure of S-(S/B)-S, where S is a polystyrene block and S/B is a styrene/butadiene copolymer block. Preferably, the styrene content of the soft phase is more than 30 wt % relative to the soft phase. The styrene butadiene block (S/B) preferably consists of 15 to 70 wt % of styrene and 30 to 85 wt % of butadiene. These measures contribute to good adhesion properties of the floor covering and high stability.

A further embodiment provides that the styrene-based thermoplastic elastomer of component C comprises at least one compound selected from the group consisting of styrene-butadiene-styrene block copolymer (SBS), styrene-isoprene-styrene block copolymer (SIS), styrene-ethylene-butylene-styrene block copolymer (SEBS) and styrene-ethylene-propylene-styrene block copolymer (SEPS). This contributes to good adhesion properties and good mechanical stability. SIS, SBS or SEBS and mixtures thereof are particularly preferred. SBS may be present in particular as poly(styrene-b-butadiene-b-styrene). SIS may be present in particular as poly(styrene-b-isoprene-b-styrene). SEBS may be present in particular as poly(styrene-b-ethylene-butadiene-b-styrene). SEPS may be present in particular as poly(styrene-b-ethylene-propylene-b-styrene).

Advantageously, the styrene-based thermoplastic elastomer of component C comprises a block copolymer. The hard phase and the soft phase are then present in one molecule. This also contributes to good adhesion properties of the floor covering and high stability.

Another advantageous embodiment provides that the styrene-based thermoplastic elastomer contains a proportion of diblock copolymer. This also contributes to good adhesion properties of the floor covering and high stability. Preferably, the styrene-based thermoplastic elastomer contains a proportion of polystyrene-diblock copolymer. It is preferred for the diblock content relative to component C to be more than 5% and particularly preferred to be more than 10%. Particularly good properties are obtained with a diblock content of more than 15% relative to component C. Advantageously, the diblock content relative to component C is less than 75%.

Another improvement provides that the component C has a styrene content of between 15 wt % and 80 wt %. Preferably, the styrene content is more than 30 wt %. A styrene content of component C of more than 40 wt % is particularly preferred. This contributes to good adhesion properties of the floor covering and high stability.

Advantageously, it is provided that the styrene-based thermoplastic elastomer has a tri-block structure S-X-S, wherein S is a styrene block and X is a block having elastomeric properties at 20° C. Preferably, the styrene block is a glassy or crystalline block at 20° C., which melts at higher temperatures. These measures contribute to good adhesion properties of the floor covering and high stability. Block X can form the soft phase and styrene blocks S the hard phase of the thermoplastic elastomer.

Preferably, component C accounts for between 10 and 85 parts by weight relative to the total of the polymers in the polymer composition. Particularly preferably, component C accounts for between 30 and 70 parts by weight. This contributes to good adhesion properties of the floor covering and high stability.

An advantageous embodiment provides that component B comprises a polymer having a monomer unit which matches a monomer unit of the olefin-based polymer of component A and/or a monomer unit of the styrene-based thermoplastic elastomer of component C. This contributes to good adhesion properties of the floor covering and high stability.

According to a particularly advantageous embodiment, it is provided that the first polymeric component comprises component A, component B and component C.

A further improvement provides that during softening, a temperature above the softening temperature of both the first polymeric component and the second polymeric component is reached. The softening temperature can be determined as the so-called Vicat softening temperature according to DIN EN ISO 306 in the form valid on 1 Jul. 2016.

A further improvement can be achieved by the polymer composition having a filler. Preferably, the filler comprises at least one substance selected from the group consisting of chalk, silicic acid, silica, aluminum hydroxide, kaolin, sodium aluminum silicate, glass powder and wood flour. According to the invention, it is particularly preferred if the filler contains chalk. Preferably, the filler is contained in the polymer composition in a proportion by weight between 50 and 500 relative to the total amount of polymers in the polymer composition. It is particularly preferred if the aforementioned proportion by weight is between 150 and 300.

Advantageously, the polymer composition comprises processing aids. The processing aid may preferably comprise stearic acid and/or a resin, in particular a hydrocarbon resin. The processing aid may be provided in the polymer composition in particular in a weight proportion between 2 and 20 relative to the total amount of polymers in the polymer composition.

The indications of parts by weight of components of the polymer composition shall, unless otherwise stated, refer to the total of the polymers in the polymer composition, which together make up 100 parts by weight.

Preferably, the polymer composition comprises an oil. A synthetic oil is particularly preferred. The oil may be provided in the polymer composition in particular in a weight proportion between 1 and 50 relative to the total amount of polymers. The oil helps to improve product properties and facilitate processing.

The polymer composition preferably comprises an antioxidant.

Preferably, the polymer composition comprises a colorant. The colorant preferably contains inorganic and/or organic pigments. The colorant may be provided in the polymer composition in particular in a weight proportion between 2 and 40 relative to the total amount of polymers in the polymer composition.

A preferred design of the invention provides that the density of the polymer composition is between 0.95 g/cm$^3$ and 2.5 g/cm$^3$. This contributes to good adhesion properties of the floor covering and high stability. Densities of the polymer composition, which lie above the densities of the polymers, are obtained, among other things, by the fact that the polymer composition contains fillers.

Preferably, the polymer composition does not contain chlorine-containing and/or halogen-containing compounds. The polymer composition is preferably free of polyvinyl chloride (PVC).

Preferably, the floor covering has a tensile strength of more than 6 N/mm$^2$. A tensile strength of more than 7.5 N/mm$^2$ is particularly preferred.

Preferably, the floor covering has an elongation at break of more than 25%. The elongation at break is particularly preferred at more than 50%. Tensile strength and elongation at break are determined in the tensile test in accordance with ISO 37 (in the version valid on 1 Jul. 2016) on S1 test specimens at 23° C.

Preferably, the floor covering has a tear strength of more than 25 N/mm. The tear strength is particularly preferred at more than 35 N/mm. The tear strength can be determined in accordance with ISO 34-1, method B, mode of operation A (in the version valid on 1 Jul. 2016).

Preferably, the Shore D hardness of the floor covering is between 35 and 60. A Shore D hardness between 45 and 55 is particularly preferred. The Shore D hardness can be determined in accordance with DIN ISO 7619-1 (in the version valid on 1 Jul. 2016).

Preferably, the peel strength of the floor covering is more than 0.5 N/mm. A peel strength of more than 1.0 N/mm is particularly preferred. The peel strength is determined according to EN 1372:2015. Adhesion can be carried out on beech plywood with the dispersion adhesive Wulff Supra-Strong.

The preferred temperature for mixing is between 100° C. and 180° C. This makes it possible to soften the first and second polymeric components, facilitates, and accelerates the mixing process.

Preferably, when mixing the first and second polymeric components, energy is supplied to soften the first and second polymeric components. Preferably, the first polymeric component is melted in the process. An energy supply that increases the temperature can occur through shear forces generated by the mixer during mixing. Alternatively or additionally, heat can also be supplied, e.g. by heating before and/or during mixing.

Mixing is preferably carried out in an internal mixer and/or in a mixing extruder.

Forming preferably involves calendering in a calender line.

Forming preferably involves extrusion through a wide slot die head. In particular, the wide slot die head can be part of a roller head line. Here, the polymer composition is conveyed, e.g. via a wide slot die head, into the roll nip of a calender. The calender calibrates the material to the set final thickness.

Preferably, the process after forming includes cooling of the sheet material. Cooling can be carried out in particular by means of chill rolls.

Forming preferably involves structuring the surface of the sheet material, e.g. by means of an embossing roll.

A further improvement provides that the process comprises the application of decorative particles after or during forming.

Preferably, the process after forming includes the sanding of the sheet material. In particular, the rear face of the sheet material can be sanded. This contributes to good adhesive values of the floor covering.

Preferably, the process after forming includes cutting the sheet material to length. The cut-to-length sheet material can then be stored as a plate or as a roll.

Preferably, the sheet material is web-shaped or plate-shaped.

The floor covering preferably comprises at least one layer containing the polymer composition and at least one further layer. The layer with the polymer composition can form a base layer of the floor covering. Preferably, at least one further layer is applied to the sheet material during production.

Preferably, the sheet material has one usage face and one rear face. The rear face is applied to a subfloor during installation. In particular, the rear face can be glued to the subfloor. The sheet material has a length and a width, each of which are multiples of the thickness of the sheet material. The sheet material can be rolled into rolls, for example. The sheet material can also be available as tiles.

A further development of this inventive idea provides that the at least one further layer comprises a covering layer attached to the usage face. In particular, the covering layer may comprise a plastic film. The covering layer can form a wear layer of the floor covering and may be laminated onto the base layer. Preferably, the covering layer is transparent. It is particularly preferred when the covering layer is a transparent ionomer film. In particular, the film may be provided with an adhesive layer. The film provided with the adhesive layer and the base layer can be adhered by laminating under supply of heat and pressure. Preferably, the adhesive layer comprises at least one olefin-based polymer selected from the group consisting of ethylene vinyl acetate (EVA), ethylene methacrylic acid (EMA), ethylene butyl acrylate (EBA), ethylene ethyl acrylate (EEA), ethylene propylene copolymer (EPM), very low density polyethylene (VLDPE), linear low density polyethylene (LLDPE), polyolefin elastomer (POE) and polyolefin plastomer (POP).

An advantageous embodiment provides that the at least one further layer comprises an adhesive layer applied to the rear face of the base layer. In particular, the adhesive can be applied in advance.

Advantageously, the adhesive layer is provided with a removable cover. In this way, the floor covering provided with an adhesive layer can be produced in advance and stored without any problems. During installation, the cover is removed and the floor covering can be adhered to a subfloor.

The preferred thickness of the floor covering is between 1 mm and 10 mm.

A preferred embodiment provides that the first and second polymeric components are miscible with each other.

Preferably, it is provided that each of the component A, component B and component C has a different composition.

Preferably, component A does not include any grafted polymers.

Preferably, component C does not include any grafted polymers.

Further objects, features, advantages and possible applications of the present invention result from the following description of embodiments as well as the drawings. All features, which are disclosed and/or shown in the drawings, individually or in any meaningful combination, form the subject matter of the invention, even independently of the summary in individual claims or their references to other claims.

Figures 2, 3:
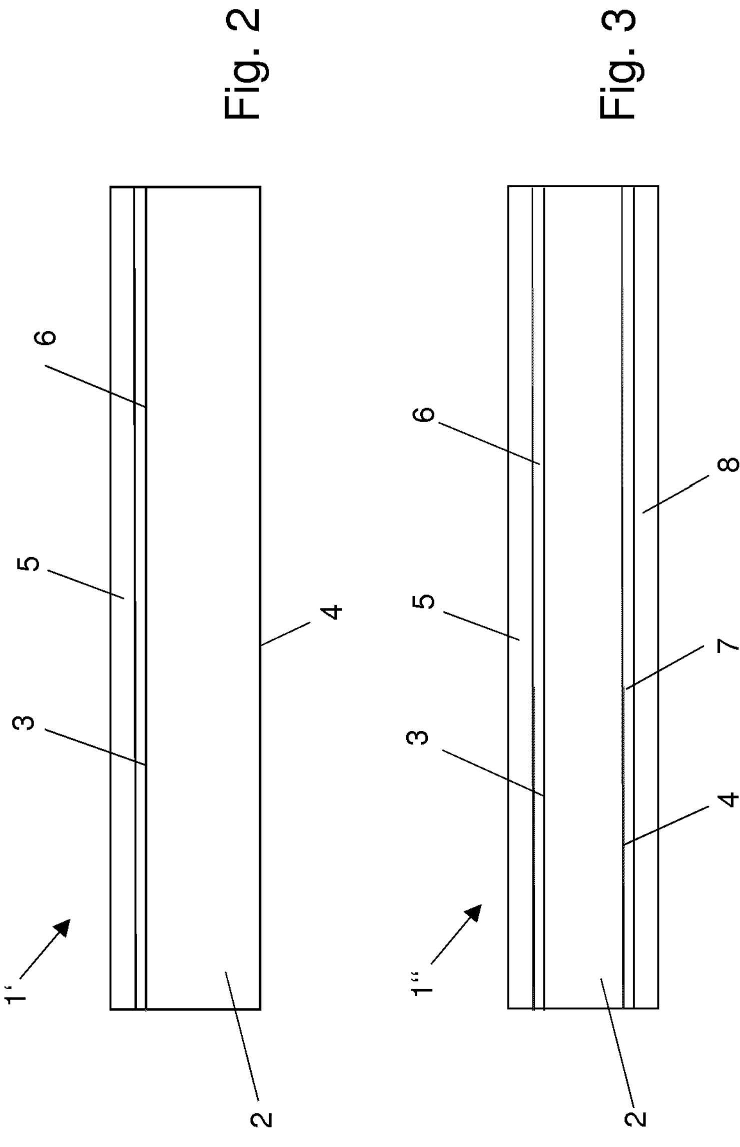
Figure 4:
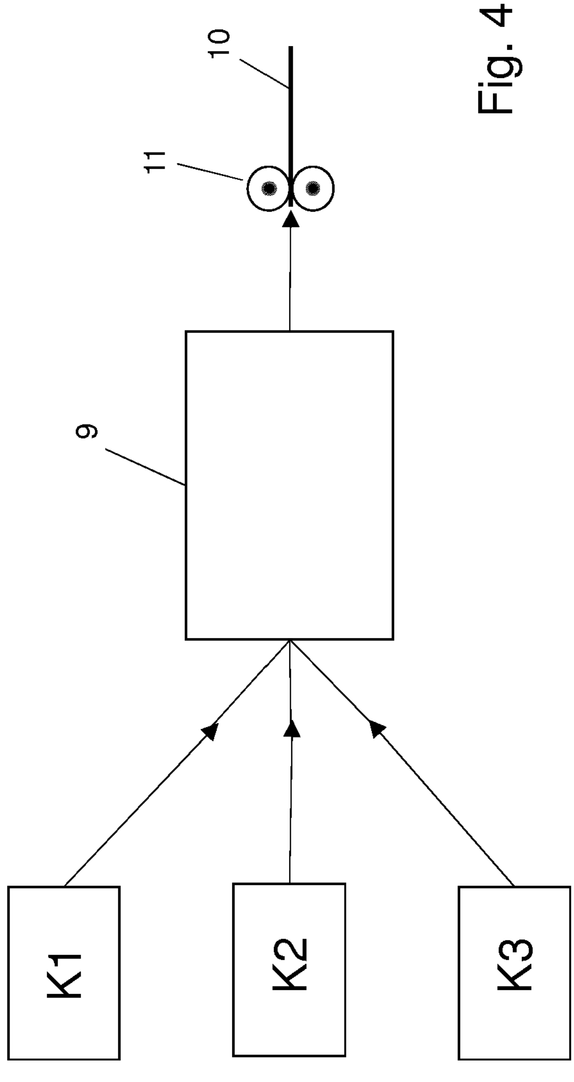

In the drawings:

FIG. 1: shows a schematic perspective view of a floor covering according to the invention;

FIG. 2: shows a schematic side view of a further embodiment of a floor covering according to the invention;

FIG. 3: shows a schematic side view of another embodiment of a floor covering according to the invention;

FIG. 4: shows a schematic representation of the production process.

FIG. 1 schematically shows a floor covering 1 according to the invention. The floor covering shown is a sheet material whose thickness d is considerably smaller than its length l and width b. In particular, the thickness d can be between 1 and 10 mm. The width b and the length l can be dimensioned according to the desired delivery form of the floor covering. In particular, the floor covering can be supplied in rolls or tiles.

The floor covering 1 has a base layer 2 with a polymer composition described in more detail below.

The base layer 2 has a usage face 3 and a rear face 4. The usage face 3 is arranged facing the room when the floor covering is used as intended. The usage face can be designed as a decorative side. The rear face 4 is arranged facing the substrate, for example the screed. The rear face 4 can be adhered to the subfloor using an adhesive for floor coverings, in particular a dispersion adhesive.

FIG. 2 shows a floor covering 1', which in turn comprises a base layer 2 of a polymer composition. The base layer 2 is provided with a covering layer 5 on its usage face 3. The covering layer 5 is a transparent film according to a preferred design. The covering layer 5 is permanently adhered to the base layer 2 via an adhesive layer 6. The covering layer 5 is resistant to the usual stresses of a floor covering. In particular, an ionomer film may form the covering layer 5. Such films may be made from DuPont's Surlyn 1706 material, for example. The adhesive layer may be made of DuPont's Nucrel 0903, for example. Nucrel 0903 comprises a copolymer of ethylene and methacrylic acid having an MA content of 9%. The covering layer 5 and the adhesive layer 6 can be provided in particular as coextruded material with a thickness of about 200 μm and laminated onto the previously produced base layer 2 by supplying heat.

The representation in the figures serves only to clarify the product structure. The representation is not true to scale.

The structure of the floor covering 1" shown in FIG. 3 corresponds to that shown in FIG. 2, as far as the base layer 2 and the usage face 3 are concerned. Reference is made to the corresponding description. In addition, floor covering 1" has a pre-applied adhesive layer 7 on the rear face 4. The adhesive layer 7 is provided with a removable cover 8. The floor covering 1" can be adhered to a substrate without the need for applying an adhesive when laying. For laying, it is sufficient to remove the cover 8 and bring the floor covering 1" that is equipped with the adhesive layer 7 into contact with the substrate.

FIG. 4 schematically shows the production of the floor covering. Initially, the first and second polymeric components K1 and K2 are provided. The first polymeric component K1 comprises a thermoplastic and/or a thermoplastic elastomer. The second polymeric component K2 comprises a rubber whose polymers are crosslinkable but substantially non-crosslinked. These may be the substances indicated in the embodiment below. For example, according to the fourth embodiment, 35 parts by weight of VLDPE and 35 parts by weight of EVA can be provided, which together form the first polymeric component K1. Furthermore, 30 parts by weight of EVM can be provided, which form the second polymeric component K2.

In addition, the other components of the polymer composition are provided. These are collectively referred to as K3. Other constituents may include in particular fillers, processing aids, oil, antioxidants and/or colorants. For example, 300 parts by weight of filler (FS), 0.5 parts by weight of processing aid (VHM) and 0.5 parts by weight of antioxidants (AS) can be provided according to the fourth embodiment. In addition, oil can be provided if the respective embodiment so provides. For example, 4.5 parts by weight of oil are provided for exemplary embodiment 10.

The first polymeric component K1 and the second polymeric component K2 as well as the other components K3 are placed together in a mixer 9 and mixed intensively. If, as indicated in the embodiments, the first or second polymeric component K1 and/or K2 comprises a plurality of substances, these are preferably added separately to the mixer 9, i.e. not yet mixed with each other. The mixer 9 can be designed e.g. as an internal mixer or as a mixing extruder. During mixing, shear forces can generate heat to soften the first and second polymeric components K1 and K2. The mixing process generates the shear forces in the material. Alternatively or additionally, heat can be supplied, e.g. by a heater. Preferably, the first and second polymeric components K1 and K2 are softened to such a degree that the polymers of the first and second components K1 and K2 are melted. The mixing process is carried out until the softened polymers of the first and second polymeric components K1 and K2 form a homogeneous mass. The result is a polymer blend. The particles of the filler are embedded in the polymer blend.

After mixing, the polymer composition is formed into a sheet material 10. Forming can be carried out, for example, by an extruder with a wide slot die head and/or by calendering in a calender line 11. Preferably, the polymer composition is first extruded by an extruder with a wide slot die head and then additionally calendered to the desired thickness.

Calendering takes place in particular in a warm state, in which the composition is already dimensionally stable but can still be plastically deformed. Subsequently, the sheet material 10 is cooled, e.g. to less than 60° C. Cooling can take place in particular via chill rolls.

The sheet material 10 can be sprinkled with decoration granules on the usage face 3 to create optically appealing floor coverings. The application of decoration granules can take place in particular before and/or during the forming process. The usage face 3 can also be decorated in another way.

If the floor covering 1 has a further layer, it can be applied to the sheet material 10. For example, a covering layer 5 with the adhesive layer 6 can be laminated onto the sheet material 10, which forms the base layer 2, in order to obtain the floor covering shown in FIG. 2. In addition, an adhesive layer 7 and a cover 8 can be applied to the rear face to obtain the floor covering shown in FIG. 3.

The rear face 4 can be sanded to achieve improved adhesive bonding. If the floor covering is provided with an adhesive layer 7, sanding is carried out before the adhesive layer 7 is applied.

In the following, a number of examples for the polymer composition are described. In addition, a peel strength is specified for each example. The peel strength is determined according to the standard EN 1372:2015. The adhesion is carried out onto beech plywood by means of the dispersion adhesive Wulff Suprastrong. The tensile strength and elongation at break are also indicated. These are determined in a test according to the standard ISO 37 on 51 test specimens at 23° C. In addition, the tables contain information on the tear strength determined in accordance with the standard ISO 34-1, method B, mode of operation A. The Shore D hardness is determined according to the standard DIN ISO 7619-1. The viscosity is determined as the melt volume flow rate (MVR) according to the standard DIN EN ISO 1133. The information refers in each case to the standards in the version valid on 1 Jul. 2016. The glass transition temperature $T_G$ is determined according to DIN EN ISO 11357-2 in the version valid on 1 Jul. 2016. The values stated each are determined according to the half-step height method.

The following components are components of the polymer composition given as an example:

First Polymeric Component K1

In the following, various substances are described that alone or together can form the first polymeric component in the embodiments. The substances can be classified into three groups called component A, component B and component C.

Component A

K1-VLDPE denotes a VLDPE. The product is available under the name Clearflex CL DO (Versalis). The density is 0.90 g/cm$^3$. The melt volume flow rate MVR)(190°) is 3 g/10 min.

K1-EVA denotes an EVA available under the product name GreenFlex ML 50 (Versalis). The proportion of vinyl acetate (VA) is 19%. The density is 0.94 g/cm$^3$. The melt volume flow rate MVR)(190°) is 2.5 g/10 min.

K1-POE denotes a POE that is available under the product name Exact 8210 (Exxon). The product contains an ethylene octene copolymer. The density is 0.882 g/cm$^3$. The melt volume flow rate MVR (190°) is 10 g/10 min.

Component B

K1-MAH-LDPE denotes a LDPE grafted with maleic acid anhydride (MAH). The product is available under the product name Fusabond E226 (DuPont). The LDPE is grafted with 1 wt % MAH. The density is 0.93 g/cm$^3$. The melt volume flow rate MVR)(190°) is 1.5 g/10 min.

Component C

K1-SIS denotes a thermoplastic elastomer comprising styrene isoprene styrene (SIS). The product is available under the product name Hybrar 5127 (Kuraray). SIS 1 contains isoprene monomers built in the polymer chain as 1,2-vinyl isomers. The proportion of isoprene groups in vinyl position is more than 70%. The glass transition temperature $T_G$ of the soft phase is plus 8° C. The density is 0.94 g/cm$^3$. The melt volume flow rate MVR (190°) is 5 g/10 min. The styrene content is 20%.

K1-SBS denotes an SBS. This is available under the product name Styroflex 2 G 66 (Styrolution). The styrene content is 60%. The glass transition temperature $T_G$ of the soft phase is minus 39° C. The density is 1.0 g/cm$^3$. The melt volume flow rate MVR (200°) is 13 g/10 min.

Second Polymeric Component K2

K2-NBR1 denotes an NBR available under the product name Krynac 3345 (Arlanxeo). The proportion of acrylonitrile is 33%. The density is 0.97 g/cm$^3$. The Mooney viscosity (ML (1+4)/100° C.) is 45 MU. The solubility parameter $\delta$ is 19.0 MPa$^{1/2}$.

K2-NBR2 denotes an NBR available under the product name Krynac 4975 (Arlanxeo). The proportion of acrylonitrile is 48.5%. The density is 1.0 g/cm$^3$. The Mooney viscosity (ML (1+4)/100° C.) is 75 MU. The solubility parameter $\delta$ is 21.1 MPa$^{1/2}$.

K2-EVM1 denotes an EVM available under the product name Levapren 500 (Arlanxeo). The proportion of vinyl acetate is 50%. The density is 1.0 g/cm$^3$. The Mooney viscosity (ML (1+4)/100° C.) is 27 MU. The solubility parameter $\delta$ is 17.6 MPa$^{1/2}$.

K2-EVM2 denotes an EVM available under the product name Levapren 800 (Arlanxeo). The proportion of vinyl acetate is 80%. The density is 1.11 g/cm$^3$. The Mooney viscosity (ML (1+4)/100° C.) is 28 MU. The solubility parameter $\delta$ is 18.2 MPa$^{1/2}$.

K2-EPDM denotes an EPDM that is available under the product name Keltan 2470 (Arlanxeo). The proportion of ethylene is 69%. The density is 0.86 g/cm$^3$. The Mooney viscosity (ML (1+4)/100° C.) is 25 MU. The solubility parameter $\delta$ is 16.1 MPa$^{1/2}$.

K2-NR denotes a natural rubber, which is available under the product name CV 60 (Weber & Schaer). The density is 0.93 g/cm$^3$. The Mooney viscosity (ML (1+4)/100° C.) is 60 MU. The solubility parameter $\delta$ is 16.5 MPa$^{1/2}$.

K2-SBR denotes an SBR that is available under the product name Europrene 1502 (Versalis). The styrene content is 23.5%. The density is 0.94 g/cm$^3$. The Mooney viscosity (ML (1+4)/100° C.) is 52 MU. The solubility parameter $\delta$ is 17.3 MPa$^{1/2}$.

Further Components of the Polymer Composition

FS denotes a filler. In the recipe examples chalk is used as filler.

Oil denotes an oil. Synthetic oil is used in the recipe examples.

VHM denotes a processing aid. In the examples shown, stearic acid is used as a processing aid.

AS denotes an antioxidant. In the examples, Irganox 1010 (BASF) is used as an antioxidant.

The weight proportions for the individual components are given in the tables. The figures each refer to the total of the polymers in the polymer composition, which together make up 100 parts by weight.

Table 1 shows the compositions 1 to 7. Of these, composition 1 and 2 are comparative examples, while compositions 3 to 7 are exemplary embodiments of the invention. The polymer compositions each contain K1-VLDPE and K1-EVA as the first polymeric components. Compositions 1 and 2 do not contain rubber. Compositions 3 to 7 contain a rubber as a second polymeric component. Depending on the embodiment, these are K2-NBR, K2-EVM, K2-EPDM, K2-NR or K2-SBR. The embodiments 3 to 7 each contain 35 parts by weight of VLDPE and 35 parts by weight of K1-EVA. Thus, the first polymeric component formed from these makes up 70 parts by weight. The second polymeric component accounts for 30 parts by weight each. In addition, the embodiments shown in table 1 and in the other tables each contain filler (FS), processing aid (VHM) and antioxidant (AS). Composition 1, as well as the compositions described in the other tables, also contains synthetic oil (OIL).

The measured values shown in the lower part of the table show that the peel strength of compositions 1 and 2 is very low at 0.2 N/mm. The peel strength is a measure of the adhesion properties of the floor covering. For good adhesion of the floor covering to the subfloor, it is desirable that the peel strength is 0.5 N/mm or more. Examples 3 to 7 show that floor coverings made of compounds containing a rubber demonstrate considerably improved peel strength. Table 1 also clearly shows that compositions 3 to 7 also have improved mechanical properties compared to compositions 1 and 2. Thus, in particular the elongation at break is improved.

TABLE 1

| | 1 | 2 | 3 | 4 | 5 | 6 | 7 |
|---|---|---|---|---|---|---|---|
| K1-VLDPE | 50 | 50 | 35 | 35 | 35 | 35 | 35 |
| K1—EVA | 50 | 50 | 35 | 35 | 35 | 35 | 35 |
| K2—NBR | | | 30 | | | | |
| K2—EVM | | | | 30 | | | |
| K2—EPDM | | | | | 30 | | |
| K2—NR | | | | | | 30 | |
| K2—SBR | | | | | | | 30 |
| FS | 300 | 300 | 300 | 300 | 300 | 300 | 300 |
| OIL | 4.5 | 0 | 0 | 0 | 0 | 0 | 0 |
| VHM | 0.5 | 0.5 | 0.5 | 0.5 | 0.5 | 0.5 | 0.5 |
| AS | 0.5 | 0.5 | 0.5 | 0.5 | 0.5 | 0.5 | 0.5 |
| Peel strength [N/mm] | 0.2 | 0.2 | 1.0 | 2.3 | 0.5 | 0.6 | 0.7 |
| Tensile strength [N/mm] | 9.1 | 10.1 | 7.1 | 6.4 | 7.0 | 5.7 | 5.3 |
| Elongation at break [%] | 15 | 14 | 25 | 31 | 22 | 17 | 18 |
| Tear strength [N/mm] ISO | 37 | 39 | 38 | 32 | 38 | 30 | 28 |
| Hardness [Shore D] | 49 | 52 | 43 | 41 | 45 | 41 | 36 |
| MVR [cm$^3$/10 min] 190° C./21.6 kg | 8.4 | 4.8 | <1 | 8.9 | 3.0 | 19.1 | <1 |

Table 2 shows further compositions 8 to 12. Of these, composition 8 is a comparative example, while compositions 9 to 12 are according to the invention. Compositions 8 to 12 each contain the first polymeric components K1-SIS, K1-EVA, K1-POE, K1-VLDPE and K1-MAH-LDPE in the weight proportions given in the table. As a second polymeric component, the compositions 9 to 12 contain K2-NBR1, K2-NBR2, K2-EVM1 or K2-EVM2, each with 20 parts by weight. In particular, the compositions 9 to 12 show that the peel strength is considerably improved. In addition to the non-crosslinked rubber, this is also because the composition for the first polymeric component contains component A, component B and component C. In addition, table 2 shows that very good mechanical values of the floor covering are obtained, such as tensile strength, elongation at break and tear strength. The values for elongation at break and tear strength are significantly higher than in the embodiments from table 1. The level achieved for the tensile strength with values, which are considerably higher than 5 N/mm throughout, is also well suitable for floor coverings.

TABLE 2

| | 8 | 9 | 10 | 11 | 12 |
|---|---|---|---|---|---|
| K1-SIS | 40 | 35 | 35 | 35 | 35 |
| K1-EVA | 15 | 10 | 10 | 10 | 10 |
| K1-POE | 10 | 10 | 10 | 10 | 10 |
| K1-VLDPE | 15 | 10 | 10 | 10 | 10 |
| K1-MAH-LDPE | 20 | 15 | 15 | 15 | 15 |
| K2-NBR 1 | | 20 | | | |
| K2-NBR 2 | | | 20 | | |
| K2-EVM 1 | | | | 20 | |
| K2-EVM 2 | | | | | 20 |
| FS | 300 | 300 | 300 | 300 | 300 |
| OIL | 4.5 | 4.5 | 4.5 | 4.5 | 4.5 |
| VHM | 0.5 | 0.5 | 0.5 | 0.5 | 0.5 |
| AS | 0.5 | 0.5 | 0.5 | 0.5 | 0.5 |
| Peel strength [N/mm] | 0.9 | 2.1 | 1.8 | 3.4 | 3.3 |
| Tensile strength [N/mm] | 10.2 | 8.3 | 8.9 | 8.4 | 9.5 |
| Elongation at break [%] | 38 | 56 | 54 | 65 | 70 |
| Tear strength [N/mm] ISO | 49 | 47 | 48 | 47 | 47 |
| Hardness [Shore D] | 49 | 52 | 48 | 43 | 41 |
| MVR [cm$^3$/10 min] 190° C./21.6 kg | 7.2 | 6.3 | 9.5 | 8.6 | 8.4 |

Table 3 shows compositions 13 to 19. Of these, 13 is a comparative example that does not contain rubber. Compositions 14 to 19 are exemplary embodiments. In each case, component 1 is a mixture of K1-SBS, K1-VLDPE, K1-POE, K1-EVA and K1-MAH-LDPE as well as K1-SIS. Thus, the compositions each contain the components A, B and C. The respective weight proportions are given in the table. Compositions 14 to 19 each contain K2-NBR1 in different proportions by weight as a second polymeric component. Table 3 clearly shows that particularly good adhesive values (peel strength) of the floor covering are achieved with compositions 14 to 19. Some of these are well above 1 N/mm. In addition, they initially increase with the increasing proportion of the second polymeric component (cf. compositions 14 to 17). A further increase in the weight proportion of K1-NBR1 does not lead to a further increase of the peel strength, although the good level is maintained. The table also shows that compositions 14 to 19 also have good mechanical properties in other respects. Thus, very good values for elongation at break are achieved. However, with an increasing proportion of K1-NBR 1, a certain decline in tear strength can be observed. Nevertheless, the values are predominantly above 25 N/mm and thus at a level well suitable for floor coverings.

The tables also show that the respective Shore hardness can be adjusted with the compositions. The values are consistently between Shore D 35 and 60 at a level suitable for floor coverings. A number of compounds achieve the particularly preferred Shore D hardness between 45 and 55.

TABLE 3

| | 13 | 14 | 15 | 16 | 17 | 18 | 19 |
|---|---|---|---|---|---|---|---|
| K1—SBS | 20 | 18 | 16 | 14 | 12 | 10 | 8 |
| K1—VLDPE | 15 | 13.5 | 12 | 10.5 | 9 | 7.5 | 6 |
| K1—POE | 10 | 9 | 8 | 7 | 6 | 5 | 4 |
| K1—EVA | 15 | 13.5 | 12 | 10.5 | 9 | 7.5 | 6 |
| K1—MAH-LDPE | 15 | 13.5 | 12 | 10.5 | 9 | 7.5 | 6 |
| K1—SIS | 25 | 22.5 | 20 | 17.5 | 15 | 12.5 | 10 |
| K2—NBR 1 | | 10 | 20 | 30 | 40 | 50 | 60 |
| FS | 300 | 300 | 300 | 300 | 300 | 300 | 300 |
| OIL | 4.5 | 4.5 | 4.5 | 4.5 | 4.5 | 4.5 | 4.5 |
| VHM | 0.5 | 0.5 | 0.5 | 0.5 | 0.5 | 0.5 | 0.5 |
| AS | 0.5 | 0.5 | 0.5 | 0.5 | 0.5 | 0.5 | 0.5 |
| Peel strength [N/mm] | 0.9 | 1.0 | 1.3 | 1.9 | 2.1 | 2.1 | 2.0 |
| Tensile strength [N/mm] | 10.1 | 9.7 | 8.6 | 7.4 | 6 | 4.8 | 3.5 |
| Elongation at break [%] | 58 | 83 | 74 | 53 | 59 | 56 | 91 |
| Tear strength [N/mm] ISO | 47 | 45.7 | 40 | 35.1 | 29.7 | 26.6 | 22.8 |
| Hardness [Shore D] | 52 | 51 | 48 | 45 | 39 | 34 | 28 |
| MVR [cm$^3$/10 min] 190° C./21.6 kg | 20.6 | 21.6 | 12.7 | 7.9 | 4.6 | 2.6 | <1.0 |

What is claimed is:

1. A floor covering comprising a base layer comprising a sheet material with a usage face and an opposing rear face, and a wear layer adjacent the usage face of the base layer, the sheet material comprising a polymer blend comprising a first polymeric component and a second polymeric component, wherein the first polymeric component comprises at least one component C comprising a styrene-based thermoplastic elastomer, wherein the first polymeric component further comprises at least one of very low density polyethylene (VLDPE) or ethylene vinyl acetate (EVA), wherein the second polymeric component comprises a rubber selected from the group consisting of natural rubber (NR), ethylene propylene rubber (EPM), ethylene propylene diene rubber (EPDM), acrylate rubber (ACM), ethylene acrylate rubber (AEM), acrylonitrile butadiene rubber (NBR), hydrogenated acrylonitrile butadiene rubber (HNBR), chloroprene rubber (CR), chlorosulfonated polyethylene (CSM), and silicone rubber (VSI), wherein the rubber is present in the floor covering as a non-crosslinked rubber, wherein the polymer blend does not include a crosslinking system for the rubber, and wherein the wear layer is a transparent film.

2. The floor covering according to claim 1, wherein the styrene-based thermoplastic elastomer has a hard phase and a soft phase and in that the soft phase has a glass transition temperature $T_G$ of minus 50° C. or higher, and wherein the soft phase comprises styrene.

3. The floor covering according to claim 1, wherein component C comprises an isoprene monomer built in the polymer chain as 1,2-vinyl isomer.

4. The floor covering according to claim 1, wherein the styrene-based thermoplastic elastomer of component C comprises at least one compound selected from the group consisting of styrene-butadiene-styrene block copolymer, styrene-isoprene-styrene block copolymer, styrene-ethylene-butylene-styrene block copolymer and styrene-ethylene-propylene-styrene block copolymer.

5. The floor covering according to claim 1, wherein the second polymeric component comprises at least one polar rubber, wherein the polar rubber comprises at least one monomer selected from the group consisting of acrylonitrile and methacrylate.

6. The floor covering according to claim 1, wherein the first polymeric component constitutes between 30 and 98 percent by weight relative to the total weight of the first and second polymeric component in the polymer blend.

7. A method for producing a floor covering comprising the following steps:

providing a first polymeric component comprising at least one of a very low density polyethylene (VLDPE) or ethylene vinyl acetate (EVA), and wherein the first polymeric component further comprises at least one component C comprising a styrene-based thermoplastic elastomer;

providing a second polymeric component comprising a rubber selected from the group consisting of natural rubber (NR), ethylene propylene rubber (EPM), ethylene propylene diene rubber (EPDM), acrylate rubber (ACM), ethylene acrylate rubber (AEM), acrylonitrile butadiene rubber (NBR), hydrogenated acrylonitrile butadiene rubber (HNBR), chloroprene rubber (CR), chlorosulfonated polyethylene (CSM), and silicone rubber (VSI);

softening the first polymeric component and the second polymeric component by supplying energy;

producing a polymer blend by mixing the first polymeric component and the second polymeric component in the softened state in a mixer;

forming the polymer blend into a sheet material for a base layer of a floor covering, and laminating a transparent wear layer to a usage face of the base layer, wherein the method does not include a vulcanization step, and wherein the rubber is present in the floor covering as a non-crosslinked rubber.

8. The method according to claim 7, wherein the styrene-based thermoplastic elastomer has a hard phase and a soft phase and in that the soft phase has a glass transition temperature $T_G$ of minus 50° C. or higher, and wherein the soft phase comprises styrene.

9. The method according to claim 7, wherein component C comprises an isoprene monomer built in the polymer chain as 1,2-vinyl isomer.

10. The method according to claim 7, wherein the styrene-based thermoplastic elastomer of component C comprises at least one compound selected from the group consisting of styrene-butadiene-styrene block copolymer, styrene-isoprene-styrene block copolymer, styrene-ethylene-butylene-styrene block copolymer and styrene-ethylene-propylene-styrene block copolymer.

11. The method according to claim 7, wherein the second polymeric component comprises at least one polar rubber, wherein the polar rubber comprises at least one monomer selected from the group consisting of acrylonitrile and methacrylate.

12. The method according to claim 7, wherein the first polymeric component constitutes between 30 and 98 percent by weight relative to the total weight of the first and second polymeric component in the polymer blend.

* * * * *